United States Patent [19]
Hafele et al.

[11] 3,752,628
[45] Aug. 14, 1973

[54] APPARATUS FOR MOLDING PLASTIC CONTAINERS

[75] Inventors: Robert X. Hafele; Elmer L. Robertson, both of Overland Park, Kans.

[73] Assignee: Ethyl Development Corporation, Kansas City, Mo.

[22] Filed: Apr. 5, 1971

[21] Appl. No.: 130,911

[52] U.S. Cl. ............ 425/302 B, 264/94, 425/387 B
[51] Int. Cl. ............................................. B29d 23/03
[58] Field of Search ............... 425/326 B, 387 B; 264/94, DIG. 18

[56] References Cited
UNITED STATES PATENTS

| | | | |
|---|---|---|---|
| 3,025,562 | 3/1962 | Nelson | 425/387 B X |
| R24,577 | 12/1958 | Haines | 425/326 B X |
| 3,632,261 | 1/1972 | Gasior | 425/387 B X |
| 3,531,556 | 9/1970 | Mehnert | 425/326 B X |
| 3,029,467 | 4/1962 | Nelson | 425/326 B X |

Primary Examiner—H. A. Kilby, Jr.
Attorney—Donald L. Johnson, John F. Sieberth, E. Donald Mays and Arthur G. Connolly

[57] ABSTRACT

An apparatus for blow molding hollow, thermoplastic containers having cylindrical neck openings. A blow pin assembly is provided which includes a cylindrical, retractable blow pin having an annular shoulder with a sharp edge adjacent its outer end which engages an anvil surface carried by the blow mold to sever the neck waste from the plastic container. An annular groove is provided adjacent the cutting edge of the blow pin, which groove is filled by the heat-softened plastic material and, after cooling, provides a firm connection between the blow pin and the neck waste to assure that the neck waste material is severed and carried away from the plastic article upon retraction of the blow pin.

9 Claims, 5 Drawing Figures

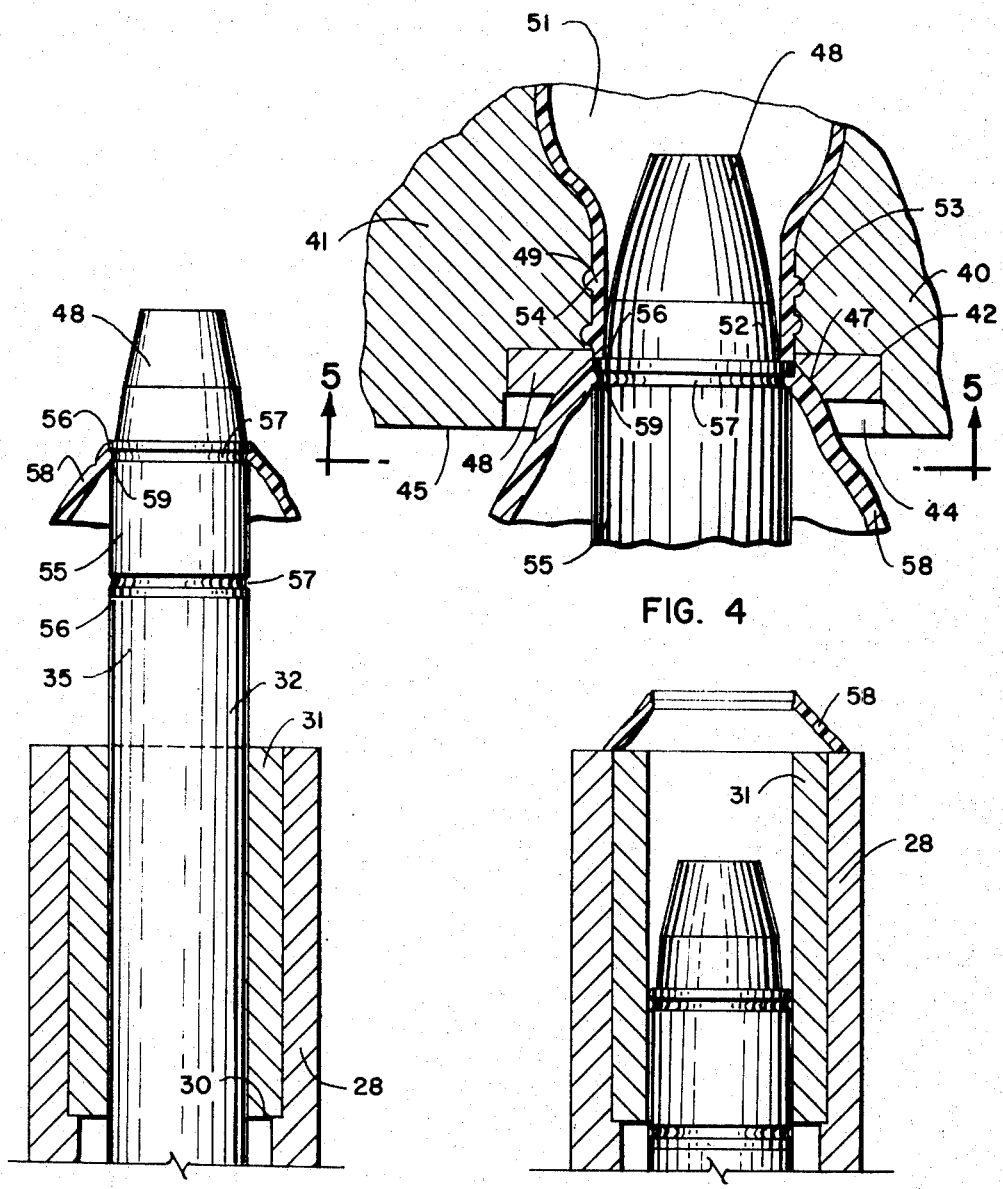

3,752,628

APPARATUS FOR MOLDING PLASTIC CONTAINERS

BACKGROUND OF THE INVENTION

1. Field of the Invention

This invention relates to a blow molding apparatus having a blow pin assembly adapted to remove the neck waste from a blow molded, hollow container.

2. Description of the Prior Art

Numerous techniques have been proposed and utilized for removal of the neck waste normally present in a blow molded container formed from a hollow, thermoplastic parison. Prior commercial methods utilized a coring and trimming operation performed subsequent to the formation of the hollow container in the blow mold. These prior art methods and apparatuses required the additional handling of the bottles, the investment and operating cost for coring and trimming machines, and the employment of additional operators, all of which added to the cost of the blow molded container.

Many methods and apparatuses for "in mold" neck finishing of blow molded containers have been proposed. In U. S. Pat. No. 2,984,865 the neck waste or "moil" is severed from the blow molded plastic article while the article is retained within the blow mold. A reciprocating blow pin carries a rotating sleeve which engages an outwardly extending, circular, severing edge formed adjacent the neck opening in the blow mold. Contact between the sleeve and the circular, severing edge cuts the neck waste from the container. The circular sleeve is provided with serations adjacent its edge which engage the neck moil and, upon rotation of the sleeve, complete the separation of the moil from the bottle neck. In the commerical versions of blow molding apparatuses utilizing a serated, rotatable sleeve for breaking the neck mold from the neck of the container, problems have been encountered caused by the filling of the serations with bits of plastic, thus rendering them ineffective to grip and rotate the neck moil to shear it from the top of the container neck. The moil remains attached to the neck and must be removed by a hand operation.

Other methods and apparatuses for severing neck waste from containers having necks wherein annular knife or cutting edges extend inwardly from the walls of the blow mold within the neck opening are shown in U. S. Pat. Nos. 3,031,718; 3,363,282; and 3,487,501. In U. S. Pat. No. 3,031,718 the neck mold insert is rotated to shear both the neck waste and the edge flash from the container neck. This requires the use of a complicated construction for the neck insert in addition to the neck-actuating device. In U.S. Pat. No. 3,363,282 a portion of the neck mold is longitudinally reciprocable whereby it severs and pushes the neck moil or waste down the blow pin, thus separating it from the plastic container to provide a finished neck. A complex apparatus is required to remove the neck flash according to the teachings of this patent. In U.S. Pat. No. 3,487,501 a rotatable blow pin is provided which carries serations in a portion of its outer surface which engage the moil or waste portion desired to be severed from the neck. Knives are carried by the mold and partially sever the moil or neck waste from the container neck. The serations can become filled with bits of plastic which decrease the capability of the rotating blow pin to grip and cleanly sever the moil or waste portion from the top of the container.

Thus, there is a need for a blow molding apparatus which will provide a positive and secure connection between the blow pin and the waste portion cut from the neck whereby the waste material may be both effectively severed from the neck and removed therefrom by withdrawal of the blow pin. The method and apparatus of the present invention provides for the positive severance and removal of the plastic moil from the neck of a blow molded plastic container.

SUMMARY OF THE INVENTION

It is an object of the present invention to provide a process and apparatus for producing blow molded plastic containers.

It is a further object of the present invention to provide a process and apparatus for efficiently and economically finishing the neck of a blow molded container while the container is retained within the blow mold.

It is also an object of the present invention to provide a process and apparatus for positively severing and removing the waste portion from the neck of a blow molded container.

It is still another object of the present invention to provide a process and apparatus which is capable of producing a variety of different sizes of blow molded plastic containers having finished necks.

The apparatus aspects of the invention may be carried out in a blow molding apparatus for producing hollow, plastic containers with necks wherein the combination inludes a pair of blow mold halves, each of which is provided with a neck-forming means defining, when closed, a generally cylindrical opening at one end thereof, the opening terminating in an arcuately shaped, outwardly inclined, terminal wall portion. A blow pin is provided that is adapted to be inserted into the neck opening. The blow pin is provided with a shoulder having a sharp edge adjacent one end, which shoulder is slightly larger than the opening and is adapted to seat on the terminal wall portion to sever or partially sever the excess plastic material from the neck. The blow pin is provided with an annular groove adjacent the sharp edged shoulder adapted to receive some of the excess plastic material and to retain the plastic material on the blow pin when the blow pin is removed from the opening. A hollow stripper sleeve slidably receives the blow pin and is adapted to strip the excess plastic material therefrom when the blow pin end is retracted into the stripper sleeve.

BRIEF DESCRIPTION OF THE DRAWING

FIG. 2 is an enlarged, elevational, partially sectional view of the blow pin and stripper sleeve of the apparatus of FIG. 1;

FIG. 3 is a view similar to FIG. 2 showing the blow pin retracted within the stripper sleeve and the removal of the plastic moil therefrom;

FIG. 4 is an enlarged, elevational, sectional view of a portion of the apparatus of FIG. 1 showing severing of the plastic moil from the neck of the container.

DESCRIPTION OF THE PREFERRED EMBODIMENTS

Figure 1:
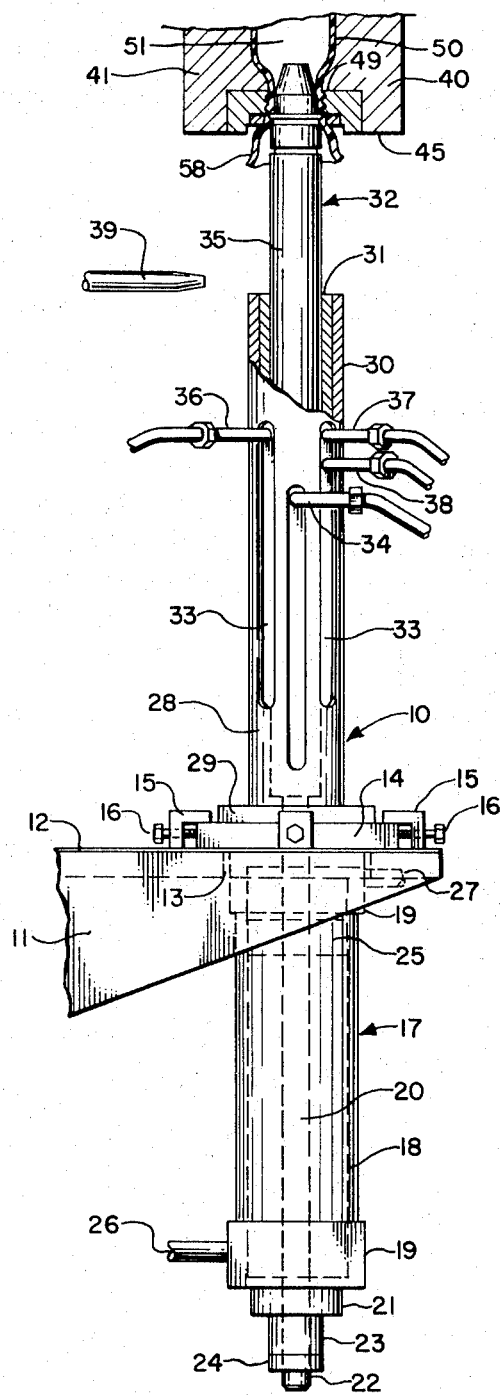
FIG. 1 is an elevational view, partially in section, of an assembly for blow molding hollow containers constructed in accordance with the present invention.

Referring now to FIG. 1, the blow molding apparatus of the present invention includes a blow assembly, designated generally by the numeral 10. The assembly is attached to mounting brackets 11, which brackets are, in turn, movably attached to the supporting frame for the blow molding machine (not shown). Top plate 12 is fixedly attached to the brackets 11 and provides a central opening 13 therein. The blow assembly 10 is provided with a fixed collar 14 which rests on top plate 12 with the lower portion of the blow assembly extending through the opening 13. The unitary blow assembly 10 is movably attached to top plate 12 by means of L-shaped brackets 15 having their lower ends attached to top plate 12. Thrust screws 16 are threadably received in brackets 15 and have their inner ends in abutment with the side of collar 14. By adjusting thrust screws 16, the position of the blow assembly can be altered to provide exact centering of the device in relation to the blow mold as hereinafter described.

A double-acting, hydraulic or pneumatic piston assembly, designated generally by the numeral 17, extends downwardly from the top plate 12. The double-acting piston assembly includes a cylindrical case 18 having closures 19 on each end thereof. The closures are provided with central openings (not shown) through which extends the piston rod 20. Packing gland 21 is provided on the lower end of the cylinder and seals the lower end of the piston rod 20 which extends therethrough. The lower end of the piston rod is provided with threads 22 and has a height-adjusting collar 23 threadably received thereon. A stop nut 24 abuts the height-adjusting collar and locks it in the desired position. Piston rod 20 has affixed to its mid-portion a piston 25. Conduits 26 and 27 are provided at the lower and upper end, respectively, of the piston assembly whereby hydraulic fluid or air may be supplied to the interior of case 18 on either side of the piston 25. Suitable means for supplying hydraulic or pneumatic pressure through these conduits is provided whereby piston 25 may be moved upwardly or downwardly in case 18 as required. A generally cylindrical stripper tube 28 is attached to the upper surface of collar 14 by means of flange 29. The flange 29 may be fixedly attached to plate 14 by welding or, if desired, removably attached by means of bolts (not shown). Referring now to FIG. 2, the upper end of the stripper tube 28 is counterbored to provide a cylindrical shoulder 30. A cylindrical stripper sleeve 31 is slidably received in the counterbore and has its lower end in abutment with the shoulder 30. Referring now to FIG. 1, the stripper sleeve surrounds the blow pin assembly, designated generally by the numeral 32, which has its lower end threadably attached to the upper end of piston rod 20. The blow pin 32 is axially slidable and maintains a close fit with the stripper sleeve 31 to insure exact alignment of the blow pin with the blow mold. Stripper tube 28 is provided with a plurality of longitudinal slots 33 through which extend service conduits. Conduit 34 supplies blowing air for inflation of the plastic article. This conduit connects with a supply conduit (not shown) contained within the hollow body 35 of the blow pin assembly. Conduit 36 is the inlet supply line for cooling water to the hollow body 35. Conduit 37 is the exit line for cooling water. Conduit 38 supplies carbon dioxide which, if desired, may be used for cooling the blow molded plastic container. Nozzle 39 is positioned opposite the upper end of the blow assembly and is adapted to supply an air jet to remove the neck flash or moil as will be subsequently described.

Figure 5:
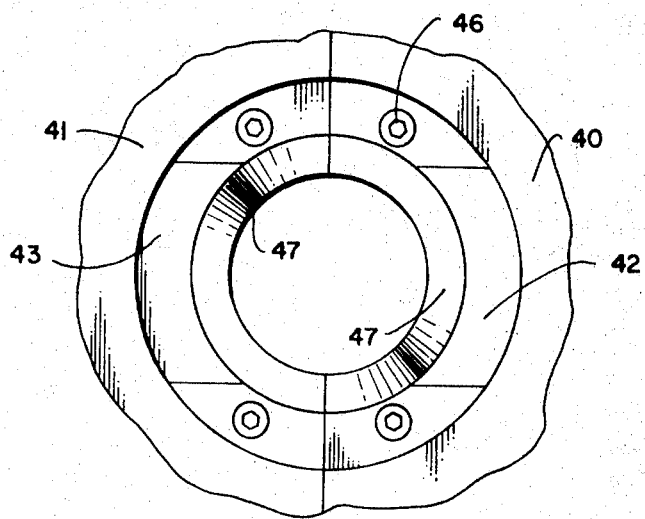
FIG. 5 is a bottom plan view of the apparatus of FIG. 4 taken along the line 5—5 with the blow pin and plastic moil removed for a clearer showing of the anvil construction.

As seen in FIGS. 1 and 4, a blow mold having partable halves 40 and 41 is positioned above the blow assembly 10 and is adapted to be engaged by the upper end of the blow pin assembly 32. The mold halves 40 and 41 are opened and closed by conventional pneumatic or hydraulic means (not shown). As seen more clearly in FIGS. 4 and 5, the mold halves are provided with halves 42 and 43 of an annular split anvil. These anvils are received in a counterbored, circular recess 44 provided in the lower face 45 of the blow mold halves. Cap screws 46 retain the anvil halves in place. Each anvil half is provided with a sloped inner wall 47. The upper end of the blow pin assembly is provided with a removable tip 48 which may be threadably received on the end of the blow pin assembly. The tip 48 is provided with upwardly tapered sidewalls whereby it will be received within the neck 49 of a plastic bottle 50, which is, in turn, contained within the cavity 51 provided by the blow mold halves 40 and 41. While the tip, as shown in the exemplary drawings, only contacts lightly the upper end 52 of the neck 49, if desired, the tip may be shaped whereby sliding contact is made between the tip and the neck of the container 49 over a substantial portion of its length. Thus, the threads 53 can be formed on container neck 49 by virtue of the flow of softened plastic material into thread recesses 54 provided in the blow mold halves, which flow is produced by either air pressure applied in blowing the container or by the contact from the blow tip 48.

Immediately below the blow tip 48 there is provided an annular cutting sleeve 55 slidably received over the reduced end of the hollow body 35 of the blow pin assembly. As seen more clearly in FIGS. 2, 3 and 4, the cutting sleeve is provided with a sharp, circular cutting edge 56 at each end thereof. Immediately below each cutting edge an annular recess 57 is provided in the outer wall of teh cutting sleeve 55.

In operation, the blow molding apparatus of the present invention receives a conventional plastic parison or hollow tube which is extended downwardly through the open halves of the blow mold 40 and 41. Conventional means close the mold halves and seal the bottom (not shown) of the plastic bottle 50. The lower end 58 of the parison extends through the neck opening provided in the mold halves. The hydraulic piston assembly is actuated moving the blow pin assembly 32 upwardly and into the lower end of the parison 58 flaring it in the manner depicted in the drawing. The tip 48 moves into the neck opening, and the circular cutting edge 56 of sleeve 55 presses against the inclined surface 47 of anvil halves 42 and 43 either partially or completely severing the neck "moil" or waste portion of the lower end of the parison 58 from the neck 49 of the plastic bottle. Since the neck moil 58 is still warm and thermoplastic, an annular bead 59 is formed on the inner wall of moil 58 and is received within the annular recess 57 provided at the upper end of the cutting sleeve 55. As chilled water flows through the blow pin assembly 32, the moil 58 is cooled and the annular bead 59 becomes rigid and firmly seated in the recess 57.

After the cooling cycle for the bottle is completed, the hydraulic cylinder is reversed to retract the blow pin assembly 32 downwardly into the stripper tube 28. As can be seen in FIG. 2, th tight fit of the bead 59 in recess 57 firmly attaches th moil 58 to the end of the blow pin assembly. Upon further retraction of the blow pin body 35, the cutter sleeve and the tip are drawn into the interior of the stripper sleeve 28 as seen in FIG. 3. In this step the lower end of the moil 58 contacts the top of either the stripper tube 28 or the stripper sleeve 31 and is stripped out of the groove 57 to remove the moil from the end of the blow pin. A pulse of air is then supplied through nozzle 39 which removes the moil 58 from the top of the stripper assembly thereby readying the blow pin assembly for the next cycle.

Thus, it can be seen from the foregoing that the apparatus of the present invention provides a novel and efficient means for blowing a plastic bottle and simultaneously finishing in the mold the neck of the bottle without further operations being required. While the apparatus has been depicted and described in conjunction with a blow molding apparatus wherein th blow pin is inserted in the bottom of the blow mold, it is to be understood that the invention is equally suitable in blow molding apparatuses wherein the blow pin is inserted into the top of the blow mold. While there has been described what is at present considered preferred embodiments of the present invention, it will be apparent to those skilled in the art that various modifications and changes may be made without departing from the essence of the invention. It is intended to cover herein all such modifications as come within the true spirit and scope of the following claims.

What is claimed is:

1. In a blow molding apparatus the combination comprising:
   a. a double-acting, fluid-actuated power assembly having an axially aligned, reciprocable rod extending from one end thereof;
   b. a hollow stripper tube attached to said power assembly at said one end, said tube surrounding and being axially aligned with and spaced from said rod;
   c. a blow pin assembly surrounded by and spaced from said tube and having one end attached to said rod whereby its other end is movable into and out of the open end of said stripper tube; and
   d. a removable generally cylindrical stripper sleeve received in the outer end of said sleeve surrounding and in slidable contact with a portion of said blow pin assembly.

2. In the apparatus of claim 1 wherein said tube is provided with a plurality of longitudinally extending slots adapted to receive connector means for supplying said cooling fluid and blowing gas to said blow pin assembly.

3. In the apparatus of claim 1 including means to support the components set forth in subparagraphs a) through d) of claim 1, said support means including means to change the axial position of said components.

4. In the apparatus of claim 1 wherein said stripper sleeve is seated on a shoulder provided on the interior wall of said stripper tube and said blow pin assembly is removably attached to said one end of said rod.

5. In a blow molding apparatus for producing hollow plastic articles with necks, the combination comprising:
   a. a pair of blow mold halves, each of which is provided with neck-forming means defining, when closed, a generally cylindrical opening at one end thereof, said opening terminating in an conically shaped, outwardly inclined, terminal wall portion;
   b. a blow pin adapted to be inserted in said opening,
      i. said blow pin providing a flat shoulder having a sharp edge adjacent one end, which shoulder is slightly larger than said opening and is adapted to seat on said terminal wall portion to sever or partially sever the excess plastic material from said neck,
      ii. said blow pin providing an annular groove adjacent and rearwardly of said sharp edged shoulder adapted to receive some of said excess plastic material and to retain said excess plastic material on said blow pin when said pin is removed from said opening; and
   c. a hollow stripper sleeve slidably receiving said blow pin and adapted to strip said excess plastic material therefrom when said one end is retracted into said stripper sleeve.

6. In the apparatus of claim 5 wherein said sharp edged, flat shoulder is provided on a separable cutter sleeve carried by said blow pin.

7. In the apparatus of claim 5 wherein said neck-forming means includes a pair of neck insert halves removably attached to said blow mold halves.

8. In the apparatus of claim 6 wherein said cutter sleeve is provided with a sharp edged, flat shoulder adjacent each end thereof.

9. In the apparatus of claim 7 including a pair of anvils removably attached to said neck insert halves to provide said conically shaped, outwardly inclined, terminal wall portion of said cylindrical opening.

* * * * *